United States Patent [19]

Riding et al.

[11] Patent Number: 5,138,012

[45] Date of Patent: Aug. 11, 1992

[54] SILICONE RELEASE COATING COMPOSITIONS

[75] Inventors: Karen D. Riding, Castleton; Judith Stein, Schenectady; Richard P. Eckberg, Saratoga Springs; James L. Desorcie; Tracey M. Leonard, both of Clifton Park, all of N.Y.

[73] Assignee: General Electric Company, Waterford, N.Y.

[21] Appl. No.: 524,938

[22] Filed: May 18, 1990

Related U.S. Application Data

[62] Division of Ser. No. 225,986, Jul. 29, 1988, Pat. No. 4,952,657.

[51] Int. Cl.$^5$ ............................................. C08G 77/20
[52] U.S. Cl. .................................. 525/478; 525/479; 528/15; 528/25; 528/31; 528/32; 528/43; 549/215; 506/441; 506/449
[58] Field of Search .............. 528/15, 25, 27, 31, 528/32, 43; 525/478, 479; 549/215; 556/441, 449, 451

[56] References Cited

U.S. PATENT DOCUMENTS

| | | | |
|---|---|---|---|
| Re. 32,245 | 9/1986 | Grenoble et al. | 427/387 |
| 3,249,581 | 5/1966 | Nelson | 524/861 |
| 3,328,450 | 6/1967 | Plveddemann | 556/445 |
| 3,410,820 | 11/1968 | Harrod | 524/860 |
| 4,061,609 | 12/1977 | Bobear | 524/703 |
| 4,279,717 | 7/1981 | Eckberg et al. | 522/31 |
| 4,421,904 | 12/1983 | Eckberg et al. | 528/27 |
| 4,430,235 | 2/1984 | Chu et al. | 556/449 |
| 4,547,431 | 10/1985 | Eckberg | 428/413 |
| 4,554,339 | 11/1985 | Hockemeyer et al. | 528/26 |
| 4,576,999 | 3/1986 | Eckberg | 525/476 |
| 4,585,670 | 4/1986 | Liu | 427/54.1 |
| 4,678,846 | 7/1987 | Weitemeyer et al. | 525/477 |
| 4,822,687 | 4/1989 | Kessel et al. | 528/15 |
| 4,822,716 | 4/1989 | Onishi et al. | 430/192 |

Primary Examiner—Melvyn I. Marquis
Assistant Examiner—R. Dean, Jr.

[57] ABSTRACT

Organopolysiloxane for use in release coating compositions are modified to control release values by substitution with phenolic compounds.

27 Claims, No Drawings

SILICONE RELEASE COATING COMPOSITIONS

This application is a division, of application Ser. No. 07/225,986, filed Jul. 29, 1988, now U.S. Pat. No. 4,952,657.

The present invention relates to silicone release coating compositions. More particularly, the present invention relates to silicone release coating compositions having organic substitution to control release of adherent materials.

BACKGROUND OF THE INVENTION

Silicone release coatings are widely used to render surfaces non-adherent. Non-adherent surfaces are necessary in the case of pressure-sensitive adhesives for easy transportation and storage prior to use of labels, decorative laminates, transfer tapes, etc. Likewise, non-adherent surfaces are desirable for food handling and industrial packaging.

There is a continuing need in the release coating industry to develop materials with "differential release" characteristics. In other words, there are wanted release coatings, the release of which may be adjusted to various levels as desired. With "differential release", premature release can be prevented while accounting for easy release when desired.

U.S. Pat. No. 4,448,815 discloses a heat curable release coating composition crosslinked by addition reaction in the presence of a platinum catalyst. There is no teaching as to a controlled release.

U.S. Pat. No. 4,576,999 discloses a UV radiation curable release coating composition crosslinked either through epoxy or acrylic functions. Again, there is no teaching as to a controlled release.

U.S. Ser. No. 171,498, filed Mar. 21, 1988, now U.S. Pat. No. 4,977,198, discloses the reaction by esterification of benzoyl compounds with epoxy functional silicone to produce a silicone polymer self-sensitized to UV radiation and having a modified release. Other methods to modify release are desirable, particularly methods with broader application to different chemistries.

U.S. Pat. No. 4,547,431 discloses UV radiation curable epoxy functional silicone further containing polyfunctional epoxy monomers. The additional monomers provide quantitative variable release. Again, other methods are desired to modify release, not specific to epoxy chemistry.

It is an object of the present invention to produce differential release silicone coatings.

It is a further object of the present invention to produce silicone polymers substituted to provide differential release.

SUMMARY OF THE INVENTION

Briefly, there is provided by the present invention release modified organopolysiloxane for use in a silicone release coating composition comprising units, in sufficient number to increase release, of the formula:

$$R_a R_b^1 SiO_{(4-a-b)/2}$$

wherein R is hydrogen, $C_{(1-8)}$ alkyl, or $C_{(1-8)}$ aryl; $R^1$ is a monovalent phenolic radical of from 6 to 26 carbon atoms; a is 0, 1 or 2; b is 1, 2 or 3; and a+b is 1, 2 or 3, and comprising units, in sufficient number to properly cure said coating composition, of the formula:

$$R_a R_c^2 SiO_{(4-a-c)/2}$$

wherein R and a are given above; $R^2$ is hydrogen, monovalent acrylic functional organic radical or monovalent epoxy functional organic radical; c is 1, 2 or 3; and a+c is 1, 2 or 3.

DETAILED DESCRIPTION OF THE INVENTION

A release modified organopolysiloxane herein is easily and simply manufactured. For example, base hydride functional organopolysiloxanes may be reacted with phenolic compounds with substitution containing terminal aliphatic unsaturation. Alternatively, a base epoxy substituted organopolysiloxane might be reacted with a carboxylic acid functional phenolic compound. Likewise, base amine functional organopolysiloxanes might be reacted with both carboxylic acid functional phenolic compound and acrylic acid. Persons skilled in the art understand the methods to obtain phenolic substitution on appropriate organopolysiloxane. Based on convenience, manufacture from base hydride functional organopolysiloxanes and phenolic compounds with unsaturated substitution is preferred and will be described in further details as follows.

The hydride functions may be present in the base organopolysiloxane as $H_2SiO_{2/2}$ units, $HSiO_{3/2}$ units, $(CH_3)_2HSiO_{\frac{1}{2}}$ units, and/or preferably $(CH_3)HSiO_{2/2}$ units. These hydride functions are reacted with the aliphatic unsaturation of the phenolic radical by an addition type in the presence of an appropriate catalyst such as a platinum catalyst. Where the release modified organopolysiloxane contains epoxy or acrylic functional organic radicals, then these functions are added in a similar reaction from base hydride functional organopolysiloxane and epoxy or acrylic functional compounds containing terminal aliphatic unsaturation.

Suitable phenolic compounds for use herein include compounds derived from phenolic compounds and having the formula:

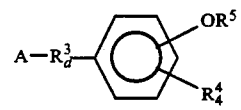

wherein A is $-CH=CH_2$ or $-C\equiv CH$, $R^3$ is a divalent hydrocarbon radical of from 1 to 18 carbon atoms, $R^4$ is hydrogen, halogen, or a monovalent organic moiety, $R^5$ is hydrogen or a monovalent substituted or unsubstituted hydrocarbon radical of 1 to 18 carbon atoms, and d is 0 or 1. Suitable $R^3$ include methylene, ethylene, propylene, etc. Suitable $R^4$ include alkyl, alkoxy, hydroxy, amine, carboxyl, etc. Suitable $R^5$ include hydrogen, alkyl, alkenyl, alkynyl, aryl, alkoxy, aryloxy, and polyether. Preferably, $R^5$ is hydrogen, $C_{1-3}$ alkyl, such as methyl, ethyl, etc., or $C_6$ aryl such as phenyl or $C_{1-6}$ carbonyl, such as acetyl, acryloyl, benzoyl, nitrobenzoyl, etc. Preferably the majority of $R^4$ are hydrogen. Also preferred are those phenolic compounds where $A-R_d^3-$ and $-OH$ bear a 1, 2 relationship on the aromatic ring.

From the above, it is clear that $R^1$ will have a formula of:

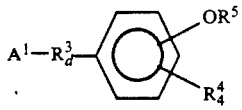

where $A^1$ is —$CH_2$—$CH_2$— or —CH=CH— and $R^3$, $R^4$, $R^5$ and d are given above. Conveniently, $R^3$ is methylene.

Suitable phenolic compounds include:
4-allyl-2-methoxyphenol, 2-allylphenol,
4-allyl-2-aminophenol, 4-vinylphenol
4-allyl-2-methylphenol, 4-allyl-2,6-dimethylphenol,
5-allyl-3-hydroxyphenol, methyl eugenol, phenyl eugenol, 4-allyl-acetoxybenzene etc.

Silicone release coating compositions are well known in the art. Presently these coatings are of two basic types, i.e. heat cured and UV cured. Heat cured release coating compositions contain terminally vinyl substituted silicone polymer, hydride substituted silicone polymer, addition reaction promoting catalyst and addition reaction inhibitor. Heat is employed to deactivate the inhibitor and to allow cure to proceed. Suitable inhibitors include dialkyl carboxylic esters such as diallylmaleate, or hydroperoxides such as taught in U.S. Pat. Nos. 4,061,609 and 4,448,815, incorporated by reference. In the heat cured release coating compositions, it is believed to be most convenient to release modify the hydride substituted silicone polymer. Thus, the hydride substituted silicone polymer will simply have some portion of the hydride functions reacted with phenolic compounds substituted with terminal aliphatic unsaturation. Suitable heat cured release coating compositions and inhibitors therefor are further described in U.S. Pat. Nos. 4,448,815 and 4,061,609, hereby incorporated by reference. UV cured release coating compositions contain epoxy and/or acrylic substituted silicone polymer and an effective catalyst to promote cure with UV light. Suitable catalysts include onium salt cationic photoinitiator for epoxy, such as halonium, sulfonium or phosphonium or free-radical photoinitiator for acrylic. U.S. Pat. Nos. 4,576,999 and 4,279,717 further describe UV cured silicone release coating compositions and are hereby incorporated by reference.

The molecular structure of release modified organopolysiloxane will change according to the type of coating composition in which it is employed. In heat cured compositions a solvent is often employed. The vinyl substituted silicone polymer portion of the release coating composition is generally linear and might have a viscosity ranging from about 50 to 100,000 centipoise at 25° C. The hydride substituted silicone polymer of heat cured compositions may take the form of either a resin or a fluid and is desirably release modified. Thus, the release modified organopolysiloxane for heat cured compositions include polymers containing units of the formulas $SiO_{4/2}$, $RR^1SiO_{2/2}$ and $R_2HSiO_{\frac{1}{2}}$; $SiO_{4/2}$, $R_2HSiO_{\frac{1}{2}}$ and $R_2R^1SiO_{\frac{1}{2}}$; $R_3SiO_{\frac{1}{2}}$, $RR^1SiO_{2/2}$ and $RHSiO_{2/2}$; $RSiO_{3/2}$, $RR^1SiO_{2/2}$, $RHSiO_{2/2}$ and $R_3SiO_{\frac{1}{2}}$; etc. In UV cured compositions, generally applied solventless, there is required only a single silicone polymer type, i.e. that containing epoxy and/or acrylic functions. To obtain appropriate viscosity of between 100 and 1500 centipoise at 25° C. for the UV cured composition, the single type should be substantially linear. Thus, the release modified organopolysiloxane for UV cured compositions include polymers containing units of the formulas $R_3SiO_{\frac{1}{2}}$, $RR^1SiO_{2/2}$, $R_2SiO_{2/2}$ and $RR^2SiO_{2/2}$; $RSiO_{3/2}$, $RR^1SiO_{2/2}$, $R_2SiO_{2/2}$ and $RR_2^1SiO_{\frac{1}{2}}$ $RR^2SiO_{2/2}$, $R_2SiO_{2/2}$ and $RR_2^1SiO_{\frac{1}{2}}$; etc., where $R^2$ is monovalent acrylic functional organic radical or monovalent epoxy functional organic radical. Broadly, a release modified organoplysiloxane should have from 0.5 to 25% by number units with $R^1$ substitution and from 0.5 to 50% by number units with $R^2$ substitution. Preferably these ranges are 1 to 15% and 1 to 25% respectively.

Of course, in either the heat or UV cured release coating compositions there may always be employed additional ingredients for their ordinary purpose which contain no units with $R^1$ substitution. In the case of heat cured compositions there may be employed an unmodified hydride substituted silicone to perform the major part of the crosslinking function. Also, in the case of the UV cured compositions, there may be employed an unmodified acrylic functional or epoxy functional silicone to form the major part of the cured matrix with the release modified organopolysiloxane providing $R^1$ functions and having only sufficient $R^2$ to properly cure the coating and prevent bleed. Thus, it is not critical that each polymer of the release coating composition be modified with an $R^1$ function. It is, however, critical that there be sufficient release modified organopolysiloxane with sufficient units having $R^1$ substitution to increase release.

In the release coating composition, the silicone polymer portion may contain from about 5 to 100% by weight and preferably 10 to 75% by weight release modified organopolysiloxane. At the same time, the composition should contain from 0.5 to 20% by weight and preferably 1.0 to 15% by weight $R^1$ functions based on the silicone polymer content.

Although not central to the instant invention, UV cured release coating compositions contain $R^2$ of epoxy and/or acrylic functions. These functions may be conveniently added to a base silicone polymer in the same manner as described above for $R^1$. Thus, where epoxy or acrylic functions are desired, unsaturated epoxy or acrylic functional compounds are added to silicone hydride units in the presence of an addition catalyst such as platinum. Suitable unsaturated epoxy or acrylic functional compounds are well known. Exemplary of the unsaturated epoxy compounds are 1-methyl-4-isopropenyl cyclohexeneoxide, 2,6-dimethyl-2,3-epoxy-7-octene, 1,4-dimethyl-4-vinylcyclohexeneoxide and 4-vinylcyclohexeneoxide. Exemplary of the unsaturated acrylic compounds are allyl acrylate and allyl methacrylate. Due to the similar chemistry involved in substituting both $R^1$ and $R^2$ for UV cured compositions, it may be desirable to perform both substitutions in a single reaction step.

The release coating composition is applied to a substrate and cured according to its chemistry. Generally the substrate is paper having a porosity to allow a desired penetration of the composition prior to cure. Other substrates include metal, foil, glass, polyethylene film, polypropylene film and polyester film.

In the case of heat cured coating compositions, it may be desirable to form the release modified organopolysiloxane simultaneously to curing the coating composition. In this case, the phenolic compound may act as a solvent up to the point of cure, at which time it adds to a base hydride substituted silicone to form an $R^1$ group and increase release. This option is more difficult to carry out in the UV cured compositions due to the necessity of initiating and controlling simultaneous addition, substitution and free radical cure reactions.

In order that persons skilled in the art may better understand the practice of the present invention, the following examples are provided by way of illustration, and not by way of limitation.

EXAMPLES

EXAMPLE 1

This example describes the preparation of a release modified organopolysiloxane containing phenol substitution and epoxy functions. A silicone-hydride fluid, trimethyl-stopped polydimethyl, methylhydrogen, silicone, 0.17 wt % H, 30 centipoise at 25° C., was devolatilized at 120 C. at 1 mm Hg. 50 g of the devolatilized fluid, 25 g of toluene and 0.01 g of platinum complex ($H_2PtCl_6$ in octanol) were weighed into a 200 mL 3-necked flask equipped with a stir bar, reflux condenser and a thermometer. The reaction was heated to 65 C. and a slow dropwise addition of 5.5 g of 2-allylphenol (flash distilled) was started. The temperature of the reaction rose to 70° C. The remainder of the Si-H groups were replaced by the slow dropwise addition of 5.2 g of 4-vinylcyclohexeneoxide at 65° C. The reaction mixture was heated at 65 C. for 3 hours. In order to ensure the completion of the reaction, i.e. that no SiH remain unreacted, 0.5 g of 1-hexene was also added to the reaction. After a 1 hour reflux, the reaction was cooled and the solvent was removed by rotary evaporation. A siloxane fluid was obtained. This material, Phenol P, was found to be completely miscible with other epoxysilicone fluids.

EXAMPLE 2

This comparative example describes the preparation of an organopolysiloxane containing benzene substitution and epoxy functions. 20 g of the devolatilized silicone-hydride fluid described in the previous example, 10 g of toluene and 0.01 g of platinum complex as in Example 1 were weighed into a 200 mL 3-necked flask equipped with a stir bar, reflux condenser and a thermometer. The reaction was heated to 65 C. and a slow dropwise addition of a mixture of 2.1 g of 4-vinylcyclohexeneoxide and 1.8 g of allylbenzene was started. The temperature of the reaction rose to 70° C. After a 3 hour hold at 65° C., Si-H groups still remained, so an additional 0.01 g of platinum complex was added. After an additional 1 hours hold, the reaction was cooled and the solvent was removed by rotary evaporation. A siloxane fluid was obtained. This material, Benzene P, was found to be completely miscible with other epoxysilicones.

EXAMPLE 3

This example describes the preparation of a release modified organopolysiloxane containing eugenol substitution and epoxy functions. 20 g of a silicone-hydride fluid described in Example 1 was weighed into a 250 ml 3-necked flask with 10 ml of toluene and 0.01 g of a platinum complex as in Example 1. The reaction was heated to 60° C. and a slow dropwise addition of 2.78 g of eugenol was started. The temperature of the reaction rose to 70° C. The remainder of the Si-H groups were replaced by the slow dropwise addition of 2.1 g of 4-vinylcyclohexeneoxide at 60° C. The reaction mixture was heated at 60° C. for 10 minutes. GC and IR were used to confirm the disappearance of olefin and Si-H, respectively. After a 1 hour heating cycle the reaction was cooled and the solvent was removed by rotary evaporation. This material, Eugenol P, was also found to be completely miscible with other epoxysilicones.

EXAMPLES 4-7

Unmodified Epoxy (UE), poly-dimethyl-methyl, beta (3,4-epoxy-cyclohexyl) siloxane, 10% by weight epoxy, 250 cps at 25° C., was blended in various ratios with the materials of Examples 1-4. The blend was diluted to 20% by weight solids with an organic solvent and catalyzed with iodonium photocatalyst at from 1 to 3% by weight to form a release coating composition. The coating composition was applied to polyethylene kraft using a coating rod and dried and cured by exposure to a mercury vapor lamp at 600 watts and 100 ft/min. Release numbers were obtained against an aggressive solvent cast SBR pressure sensitive adhesive at a pull of 400 in/min and a 180° angle. Release was measured in the units of g/2 in.

TABLE 1

| Example | Modified Epoxy Polymer (ME) | UE/ME by weight | Release Initial | 3 day | 1 week | 2 week |
|---|---|---|---|---|---|---|
| 4 | — | 100/0 | 50–60 | 80–100 | 80–110 | 70–110 |
| 5A | Phenol P | 75/25 | 65–80 | 70–90 | 110–130 | 120–140 |
| 5B | Phenol P | 50/50 | 50–65 | 50–65 | 80–100 | 100–120 |
| 5C | Phenol P | 25/75 | 125–140 | 130–150 | 210–240 | 260–290 |
| 5D | Phenol P | 0/100 | 175–200 | 230–260 | 310–340 | 340–380 |
| 6A | Benzene P | 75/25 | 40–50 | 35–45 | 50–65 | 55–65 |
| 6B | Benzene P | 50/50 | 30–40 | 45–55 | 60–75 | 70–90 |
| 6C | Benzene P | 25/75 | 40–50 | 35–50 | 50–70 | 55–65 |
| 6D | Benzene P | 0/100 | 50–60 | 45–55 | 50–60 | 55–65 |
| 7A | Eugenol P | 75/25 | 60–70 | — | 60–80 | 60–75 |
| 7B | Eugenol P | 50/50 | 75–90 | — | 90–100 | 90–110 |
| 7C | Eugenol P | 25/75 | 85–100 | — | 120–140 | 120–140 |
| 7D | Eugenol P | 0/100 | 120–140 | — | 500 | 220–250 |

The presence of phenolic structure on the silicone polymer chain provides for controlled release. The benzylic structure alone fails to provide this advantage.

What is claimed is:

1. A release modified organopolysiloxane for use in a silicone release coating composition comprising units, in sufficient number to increase release of the formula:

wherein R is hydrogen, $C_{(1-8)}$ alkyl, or $C_{(1-8)}$ aryl, $R^1$ is a monovalent phenolic radical of from 6 to 25 carbon atoms; a is 0, 1 or 2; b is 1, 2 or 3, and a+b is 1, 2 or 3, and comprising units, in sufficient number to properly cure said coating composition, of the formula:

$$R_a R^2_c SiO_{(4-a-c)/2}$$

wherein R and a are given above; $R^2$ is hydrogen or a monovalent epoxy functional organic radical; c is 1, 2 or 3 and a+c is 1, 2 or 3.

2. The release modified organopolysiloxane of claim 1 wherein the number of units containing $R^1$ substitution is from 0.5 to 25% of the total number of siloxane units in the organopolysiloxane and the number of units containing $R^2$ substitution is from 0.5 to 50% of the total number of siloxane units in the organopolysiloxane.

3. The release modified organopolysiloxane of claim 1 wherein $R^1$ has the formula:

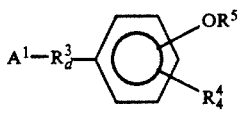

where $A^1$ is —$CH_2$—$CH_2$— or —CH=CH—, $R^3$ is a divalent hydrocarbon radical of from 1 to 18 carbon atoms, $R^4$ is hydrogen, halogen or a monovalent organic moiety, $R^5$ is hydrogen or a monovalent substituted or unsubstituted hydrocarbon radical of from 1 to 18 carbon atoms, and d is 0 or 1.

4. The release modified organopolysiloxane of claim 1 wherein $R^2$ is hydrogen.

5. The release modified organopolysiloxane of claim 1 wherein $R^2$ is monovalent epoxy functional organic radical.

6. The release modified organopolysiloxane of claim 1 comprising units of:
$SiO_{4/2}$, $RR^1SiO_{2/2}$ and $R_2HSiO_{\frac{1}{2}}$;
$SiO_{4/2}$, $R_2HSiO_{\frac{1}{2}}$ and $R_2R^1SiO_{\frac{1}{2}}$;
$R_3SiO_{\frac{1}{2}}$, $RR^1SiO_{2/2}$ and $RHSiO_{2/2}$; or
$RSiO_{3/2}$, $RR^1SiO_{2/2}$, $RHSiO_{2/2}$; and $R_3SiO_{\frac{1}{2}}$
wherein R and $R^1$ are as defined in claim 1.

7. The release modified organopolysiloxane of claim 1 comprising units of
$R_3SiO_{\frac{1}{2}}$, $RR^1SiO_{2/2}$, $R_2SiO_{2/2}$ and $RR^2SiO_{2/2}$; $RSiO_{3/2}$, $RR^1SiO_{2/2}$, $R_2SiO_{2/2}$; and
$RR^2_2SiO_{2/2}$, or $RR^2_2SiO_{2/2}$, $R_2SiO_{2/2}$ and $RR^2_2SiO_{2/2}$
where R and $R^1$ are as defined in claim 1 and $R^2$ is monovalent epoxy functional organic radical.

8. The release modified organopolysiloxane of claim 3 wherein $A^1$ is —$CH_2$—$CH_2$—.

9. The release modified organopolysiloxane of claim 3 wherein $R^5$ is hydrogen.

10. The release modified organopolysiloxane of claim 3 wherein $R^5$ is $C_{1-3}$ alkyl.

11. The release modified organopolysiloxane of claim 3 wherein $R^5$ is $C_6$ aryl.

12. The release modified organopolysiloxane of claim 3 wherein $R^5$ is $C_{1-6}$ carbonyl.

13. A silicone release composition comprising (i) linear, terminally vinyl substituted silicone polymer having a viscosity of from 50 to 100,000 centipoise at 25° C.; (ii) a release modified organopolysiloxane comprising units, in sufficient number to increase release, of the formula $$R_a R^1_b SiO_{(4-a-b)/2}$$

wherein R is hydrogen, $C_{(1-8)}$ alkyl, or $C_{(1-8)}$ aryl, $R^1$ is a monovalent phenolic radical of from 6 to 26 carbon atoms, a is 0, 1 or 2; b is 1, 2 or 3; and a+b is 1, 2 or 3, and comprising units, in sufficient number to properly cure said coating composition, of the formula:

$$R_a R^2_c SiO_{(4-a-c)/2}$$

wherein R and a are given above; $R^2$ is hydrogen; c is 1, 2 or 3; and a+c is 1, 2 or 3, (iii) an addition cure catalyst and (iv) an addition cure inhibitor.

14. The silicone release composition of claim 13 wherein the number of units containing $R^1$ substitution in said release modified organopolysiloxane is from 0.5 to 25% of the total number of siloxane units and the number of units containing $R^2$ substitution is from 0.5 to 50% of the total number of siloxane units.

15. The silicone release composition of claim 13 wherein $R^1$ has the formula:

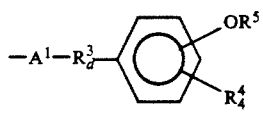

where $A^1$ is —$CH_2$—$CH_2$— or —CH=CH—, $R^3$ is a divalent hydrocarbon radical of from 1 to 18 carbon atoms, $R^4$ is hydrogen, halogen or a monovalent organic moiety, $R^5$ is hydrogen or a monovalent substituted or unsubstituted hydrocarbon radical of from 1 to 18 carbon atoms, and d is 0 or 1.

16. The silicone release composition of claim 13 wherein said release modified organopolysiloxane comprises units of:
$SiO_{4/2}$, $RR^1SiO_{2/2}$ and $R_2HSiO_{\frac{1}{2}}$;
$SiO_{4/2}$, $R_2HSiO_{\frac{1}{2}}$ and $R_2R^1SiO_{\frac{1}{2}}$;
$R_3SiO_{\frac{1}{2}}$, $RR^1SiO_{2/2}$ and $RHSiO_{2/2}$; or
$RSiO_{3/2}$, $RR^1SiO_{2/2}$, and $R_3SiO_{\frac{1}{2}}$
wherein R and $R^1$ are as defined in claim 13.

17. The release composition of claim 15 wherein $A^1$ is —$CH_2$—$CH_2$—.

18. The release composition of claim 13 comprising from 0.5 to 20% by weight $R^1$ functions based on the silicone polymer content.

19. The release modified organopolysiloxane of claim 15 wherein $R^5$ is hydrogen.

20. The release modified organopolysiloxane of claim 15 wherein $R^5$ is $C_{1-3}$ alkyl.

21. The release modified organopolysiloxane of claim 15 wherein $R^5$ is $C_6$ aryl.

22. The release modified organopolysiloxane of claim 15 wherein $R^5$ is $C_{1-6}$ carbonyl.

23. A silicone release composition comprising (i) linear, terminally vinyl substituted silicone polymer having a viscosity of from 50 to 100,000 centipoise at 25° C.; (ii) hydride substituted silicone fluid or resin, (iii) an addition cure catalyst, (iv) an addition cure inhibitor, and (v) a phenolic compound of the formula:

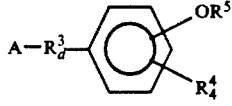

wherein A is —CH=$CH_2$ or —C≡CH, $R^3$ is a divalent hydrocarbon radical of from 1 to 4 carbon atoms, $R^4$ is hydrogen, halogen, or a monovalent organic moiety, $R^5$ is hydrogen or a substituted or unsubstituted hydrocarbon radical of from 1 to 18 carbon atoms, and d is 0 or 1 in an amount sufficient to increase the release of the composition.

24. The release modified organopolysiloxane of claim 23 wherein $R^5$ is hydrogen.

25. The release modified organopolysiloxane of claim 23 wherein $R^5$ is $C_{1-3}$ alkyl.

26. The release modified organopolysiloxane of claim 23 wherein $R^5$ is $C_6$ aryl.

27. The release modified organopolysiloxane of claim 23 wherein $R^5$ is $C_{1-6}$ carbonyl.

* * * * *